US012315427B2

(12) United States Patent
Yoo et al.

(10) Patent No.: US 12,315,427 B2
(45) Date of Patent: May 27, 2025

(54) CONTROLLER FOR GENERATING COMPENSATION VALUE AND DISPLAY DEVICE INCLUDING THE SAME

(71) Applicant: LG Display Co., Ltd., Seoul (KR)

(72) Inventors: Jaeik Yoo, Seoul (KR); Junghyeon Kim, Paju-si (KR); Sangho Yu, Seoul (KR); Tae-Wook Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/529,290

(22) Filed: Dec. 5, 2023

(65) Prior Publication Data

US 2024/0257707 A1 Aug. 1, 2024

(30) Foreign Application Priority Data

Jan. 31, 2023 (KR) ........................ 10-2023-0012326

(51) Int. Cl.
*G09G 3/20* (2006.01)
*G09G 3/32* (2016.01)

(52) U.S. Cl.
CPC ............. *G09G 3/2096* (2013.01); *G09G 3/32* (2013.01); *G09G 2300/0842* (2013.01); *G09G 2320/0233* (2013.01); *G09G 2320/045* (2013.01); *G09G 2320/048* (2013.01); *G09G 2330/021* (2013.01)

(58) Field of Classification Search
CPC ............... G09G 3/2092; G09G 3/2096; G09G 3/32–3291; G09G 2300/0421–043; G09G 2300/0842; G09G 2310/06; G09G 2310/08; G09G 2320/0233; G09G 2320/0242; G09G 2320/04; G09G 2320/043; G09G 2320/045; G09G 2320/048; G09G 2320/06; G09G 2320/0693; G09G 2330/021; G09G 2330/10; G09G 2330/12
See application file for complete search history.

(56) References Cited

U.S. PATENT DOCUMENTS

2006/0164348 A1* 7/2006 Ozawa ..................... G09G 3/22 345/76
2017/0069273 A1* 3/2017 Park ..................... G09G 3/3233
2020/0152154 A1* 5/2020 Chu ..................... G09G 3/2003
2020/0168163 A1* 5/2020 Kim ..................... G09G 3/3291
2020/0265779 A1* 8/2020 In ..................... G09G 3/3225
2024/0135893 A1* 4/2024 Hong ..................... G09G 3/3607

* cited by examiner

*Primary Examiner* — Nathan Danielsen
(74) *Attorney, Agent, or Firm* — Birch, Stewart, Kolasch & Birch, LLP

(57) ABSTRACT

A controller and a display device including the controller are discussed. The display device can perform a compensation based on a stress value for each sub-pixel and update a correction table used for compensation using a sensing value acquired at a preset period. As such, it is possible to improve the accuracy of real-time compensation. In addition, since it is possible to compensate for a sub-pixel for which a sensing value is not acquired using an indirect gain according to the ratio of the stress values of the sub-pixel to a sensing value, the accuracy of compensation can be improved even if sensing for each sub-pixel sharing a sensing line may not be easy.

20 Claims, 10 Drawing Sheets

CONTROLLER FOR GENERATING COMPENSATION VALUE AND DISPLAY DEVICE INCLUDING THE SAME

CROSS REFERENCE TO RELATED APPLICATION

This application claims priority to Korean Patent Application No. 10-2023-0012326, filed on Jan. 31, 2023 in the Republic of Korea, the entire disclosure of which is hereby expressly incorporated by reference for all purposes as if fully set forth herein into the present application.

BACKGROUND

Field

The present disclosure relates to a controller and a display device.

Discussion of the Related Art

A display device can include a plurality of sub-pixels disposed on a display panel and a plurality of driving circuits for driving the plurality of sub-pixels. The display device can display an image while controlling brightness of the plurality of sub-pixels by the driving circuits.

Each of the plurality of sub-pixels can include a light emitting device and several circuit elements for driving the light emitting device, depending on the type of the display device. As the driving time of the display device increases, the deterioration of circuit elements disposed in the sub-pixels can occur.

Due to the deterioration of circuit elements arranged in some sub-pixels, a deviation in the characteristic values can occur between the sub-pixels. As such, there can be a limitation that the uniformity of luminance represented by the sub-pixels can be degraded due to the deviation of characteristic values between the sub-pixels. Thus, the quality of an image displayed on the display panel can be degraded.

SUMMARY OF THE DISCLOSURE

Embodiments of the present disclosure can provide a scheme capable of preventing image quality deterioration due to a deviation of characteristic values between sub-pixels, by easily compensating for deviations due to variations in the characteristic values of circuit elements disposed in each of the plurality of sub-pixels of a display panel.

In one aspect, embodiments of the present disclosure can provide a display device including a plurality of pixels disposed on a substrate and including a first sub-pixel and a second sub-pixel, and a controller configured to store a first stress value corresponding to an accumulated value of image data for the first sub-pixel, and a second stress value corresponding to an accumulated value of image data for the second sub-pixel and generate, when a first sensing value of the first sub-pixel is detected during a characteristic value sensing period for the first sub-pixel and the second sub-pixel, a second compensation value for the second sub-pixel using an indirect gain according to a ratio between the first stress value and the second stress value and the first sensing value.

In another aspect, embodiments of the present disclosure can provide a controller including a memory configured to store a first correction table including a first stress value corresponding to an accumulated value of image data of a first sub-pixel and a first characteristic value corresponding to the first stress value, and a second correction table including a second stress value corresponding to an accumulated value of image data of a second sub-pixel and a second characteristic value corresponding to the second stress value, and a compensation control module configured to generate a second compensation value for the second sub-pixel by using a first sensing value of the first sub-pixel detected in a characteristic value sensing period of the first sub-pixel and the second sub-pixel, and update the first correction table.

According to embodiments of the present disclosure, it is possible to easily compensate for a deviation of characteristic values of circuit elements disposed in each of the sub-pixels and increase the accuracy of the compensation, thereby preventing deterioration in luminance uniformity due to deterioration of circuit elements and thus improving the quality of an image displayed on a display panel.

According to embodiments of the present disclosure, it is possible to reduce the number of times of sensing the characteristic values of sub-pixels and to compensate for a deviation of characteristic values of sub-pixels, thereby providing a display device capable of reducing power consumption.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF EMBODIMENTS

Figure 1:
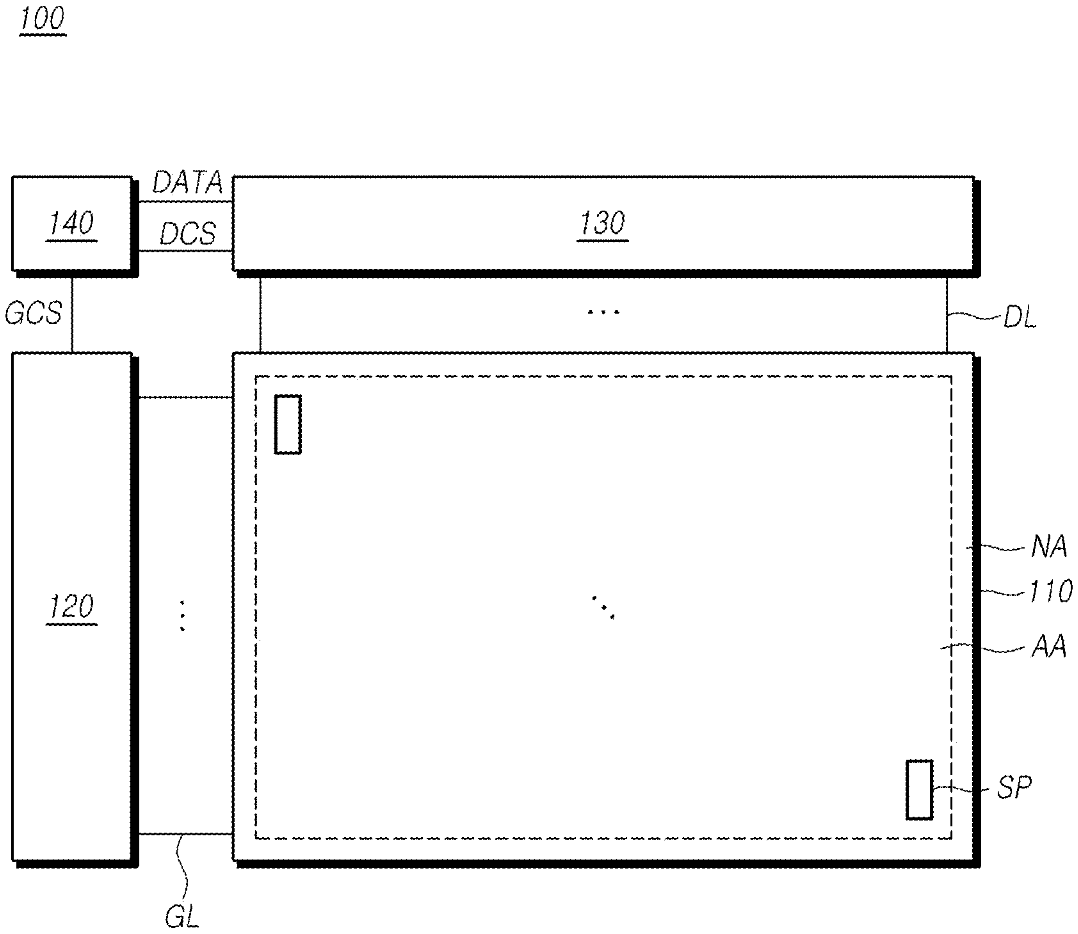
FIG. 1 schematically illustrates a configuration of a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as “including”, “comprising”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the present disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In describing a positional relationship where the positional relationship between two parts is described, for example, using “on,” “over,” “under,” “above,” “below,” “beneath,” “near,” or the like, one or more other parts can be located between the two parts unless a more limiting term, such as “immediate(ly)” or “direct(ly)” is used.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “may” fully encompasses all the meanings of the term “can”.

Hereinafter, various embodiments of the present disclosure will be described in detail with reference to accompanying drawings. All the components of each display device and each controller according to all embodiments of the present disclosure are operatively coupled and configured.

FIG. 1 schematically illustrates a configuration included in a display device 100 according to embodiments of the present disclosure.

Referring to FIG. 1, the display device 100 can include a display panel 110 including an active area AA in which a plurality of sub-pixels SP are disposed and a non-active area NA positioned outside the active area AA. The non-active area NA can surround the active area AA entirely or only in part.

The display device 100 can include a gate driving circuit 120, a data driving circuit 130, and a controller 140 for driving various signal lines disposed on the display panel 110.

A plurality of gate lines GL and a plurality of data lines DL can be disposed on the display panel 110. The sub-pixel SP can be positioned in a region where the gate line GL and the data line DL intersect.

The gate driving circuit 120 is controlled by the controller 140. The gate driving circuit 120 can sequentially output scan signals to the plurality of gate lines GL arranged on the display panel 110, thereby controlling the driving timing of the plurality of sub-pixels SP.

The gate driving circuit 120 can include one or more gate driver integrated circuits GDIC. The gate driving circuit 120 can be located only at one side of the display panel 110, or can be located at both sides thereof according to a driving method.

Each gate driver integrated circuit GDIC can be connected to a bonding pad of the display panel 110 by a tape automated bonding (TAB) method or a chip-on-glass (COG) method. Alternatively, each gate driver integrated circuit GDIC can be implemented as a gate-in-panel (GIP) type and disposed directly on the display panel 110. Alternatively, each gate driver integrated circuit GDIC can be integrated and disposed on the display panel 110 in some cases. Alternatively, each gate driver integrated circuit GDIC can be implemented in a chip-on-film (COF) method mounted on a film connected to the display panel 110.

The data driving circuit 130 can receive data signal from the controller 140 and converts the data signal into an analog data voltage Vdata. The data driving circuit 130 outputs the data voltage Vdata to each data line DL according to the timing at which the scan signal is applied through the gate line GL so that each of the plurality of sub-pixels SP emits light having brightness according to the data signal.

The data driving circuit 130 can include one or more source driver integrated circuits SDIC.

Each source driver integrated circuit SDIC can include a shift register, a latch circuit, a digital-to-analog converter, an output buffer, and the like.

Each source driver integrated circuit SDIC can be connected to a bonding pad of the display panel 110 by a tape automated bonding (TAB) method or a chip-on-glass (COG) method. Alternatively, each source driver integrated circuit SDIC can be disposed directly on the display panel 110. Alternatively, each source driver integrated circuit SDIC can be integrated and disposed on the display panel 110 in some cases. Alternatively, each source driver integrated circuit SDIC can be implemented in a chip-on-film (COF) manner. In this case, each source driver integrated circuit SDIC can be mounted on a film connected to the display panel 110, and can be electrically connected to the display panel 110 through lines on the film.

The controller 140 can supply various control signals to the gate driving circuit 120 and the data driving circuit 130, and control the operation of the gate driving circuit 120 and the data driving circuit 130.

The controller 140 can be mounted on a printed circuit board or a flexible printed circuit. The controller 140 can be electrically connected to the gate driving circuit 120 and the data driving circuit 130 through a printed circuit board or a flexible printed circuit.

The controller 140 can control the gate driving circuit 120 to output a scan signal according to timing implemented in each frame. The controller 140 can convert externally received image data to match a signal format used by the data driving circuit 130, and output the converted data signal to the data driving circuit 130.

The controller 140 can receive various timing signals including a vertical synchronization signal VSYNC, a horizontal synchronization signal HSYNC, an input data enable signal DE, a clock signal CLK from the outside (e.g., host system).

The controller 140 can generate various control signals by using various timing signals received from the outside, and can output the control signals to the gate driving circuit 120 and the data driving circuit 130.

For example, in order to control the gate driving circuit 120, the controller 140 can output various gate control signals GCS including a gate start pulse GSP, a gate shift clock GSC, and a gate output enable signal GOE.

The gate start pulse GSP can control operation start timing of one or more gate driver integrated circuits GDIC constituting the gate driving circuit 120. The gate shift clock GSC, which is a clock signal commonly input to one or more gate driver integrated circuits GDIC, controls the shift timing of a scan signal. The gate output enable signal GOE specifies timing information on one or more gate driver integrated circuits GDIC.

In addition, in order to control the data driving circuit 130, the controller 140 can output various data control signals DCS including a source start pulse SSP, a source sampling clock SSC, a source output enable signal SOE, or the like.

The source start pulse SSP can control a data sampling start timing of one or more source driver integrated circuits SDIC constituting the data driving circuit 130. The source sampling clock SSC is a clock signal for controlling the timing of sampling data in the respective source driver integrated circuits SDIC. The source output enable signal SOE controls the output timing of the data driving circuit 130.

The display device 100 can further include a power management integrated circuit for supplying various voltages or currents to the display panel 110, the gate driving circuit 120, the data driving circuit 130, and the like or controlling various voltages or currents to be supplied thereto.

Depending on the type of the display panel 110, a liquid crystal can be disposed or a light emitting device can be disposed in each sub-pixel SP.

Figure 2:
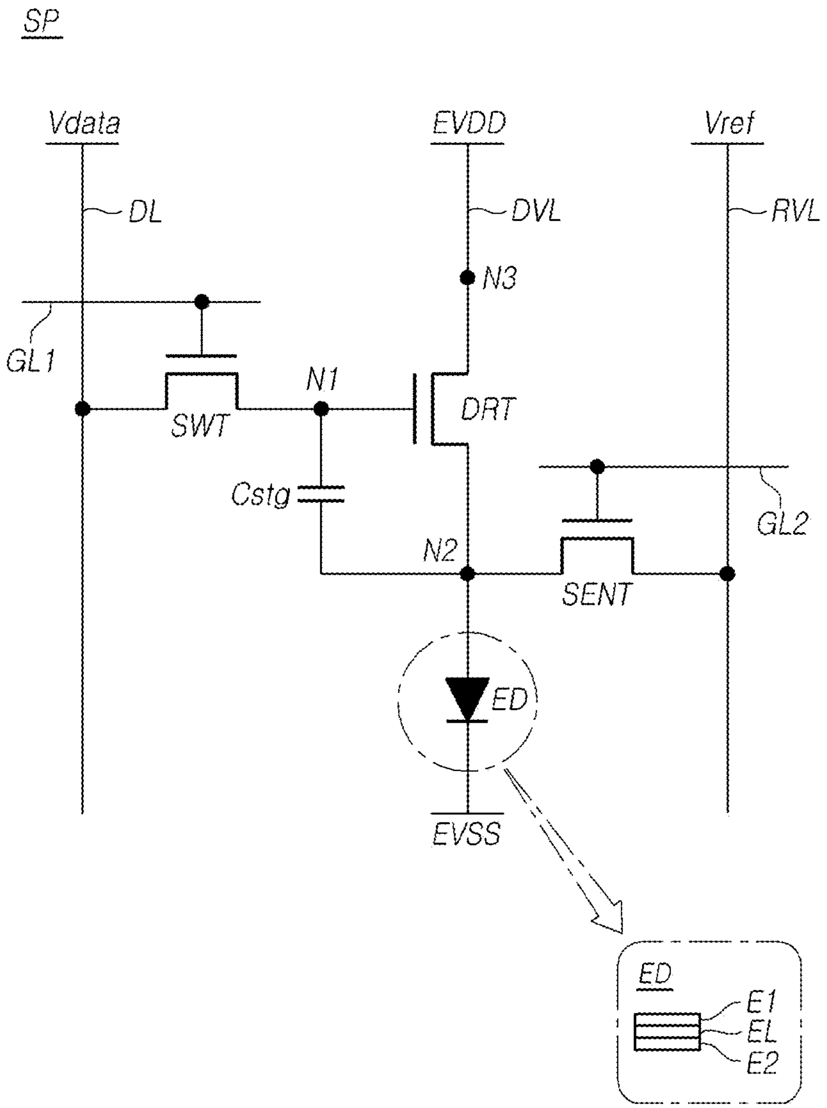
FIG. 2 illustrates an example of a circuit structure of a sub-pixel included in a display device according to embodiments of the present disclosure.

FIG. 2 illustrates an example of a circuit structure of the sub-pixel SP included in the display device 100 according to embodiments of the present disclosure. The circuit structure of the sub-pixel SP in FIG. 2 can be used in each sub-pixel SP of FIG. 1 or any other figures.

Referring to FIG. 2, there can be disposed a light emitting device ED and a driving transistor DRT for driving the light emitting device ED in each of the plurality of sub-pixels SP. In addition, at least one circuit element other than the light emitting device ED and the driving transistor DRT can be further disposed in the sub-pixel SP.

For example, as illustrated in FIG. 2, a switching transistor SWT, a sensing transistor SENT, and a storage capacitor Cstg can be further disposed in the sub-pixel SP.

The example shown in FIG. 2 illustrates a 3T1C structure in which three thin film transistors and one capacitor are disposed in the sub-pixel SP in addition to the light emitting device ED as an example, but embodiments of the present disclosure are not limited thereto. Also, the example of FIG. 2 illustrates a case in which the thin film transistors are all N-type, but in some cases, the thin film transistors disposed in the sub-pixel SP can be P-type.

The switching transistor SWT can be electrically connected between a data line DL and a first node N1.

The data voltage Vdata can be supplied to the sub-pixel SP through the data line DL. The first node N1 can be a gate node of the driving transistor DRT.

The switching transistor SWT can be controlled by a scan signal supplied to the gate line GL. The switching transistor SWT can control that the data voltage Vdata supplied through the data line DL is applied to the gate node of the driving transistor DRT.

The driving transistor DRT can be electrically connected between a driving voltage line DVL and the light emitting device ED.

A first driving voltage EVDD can be supplied to a third node N3 of the driving transistor DRT through the driving voltage line DVL. The first driving voltage EVDD can be a high potential driving voltage. The third node N3 can be a drain node or a source node of the driving transistor DRT.

The driving transistor DRT can be controlled by a voltage applied to the first node N1. In addition, the driving transistor DRT can control the driving current supplied to the light emitting device ED.

The sensing transistor SENT can be electrically connected between a reference voltage line RVL and a second node N2.

A reference voltage Vref can be supplied to the second node N2 through the reference voltage line RVL. The second node N2 can be a source node or a drain node of the driving transistor DRT.

The sensing transistor SENT can be controlled by a scan signal supplied to the gate line GL. The gate line GL controlling the sensing transistor SENT can be the same as or different from the gate line GL controlling the switching transistor SWT.

The sensing transistor SENT can control that the reference voltage Vref is applied to the second node N2. Also, in some cases, the sensing transistor SENT can control sensing the voltage of the second node N2 through the reference voltage line RVL.

The storage capacitor Cstg can be electrically connected between the first node N1 and the second node N2. The storage capacitor Cstg can maintain the data voltage Vdata applied to the first node N1 for one frame.

The light emitting device ED can be electrically connected between the second node N2 and a line to which a second driving voltage EVSS is supplied. The second driving voltage EVSS can be a low potential driving voltage.

The light emitting device ED can include a first electrode layer E1, a light emitting layer EL, and a second electrode layer E2. The first electrode layer E1 of the light emitting device ED can be electrically connected to the driving transistor DRT. The second electrode layer E2 of the light emitting device ED can be electrically connected to a line supplying the second driving voltage EVSS. The light emitting layer EL can emit light according to a driving current supplied by the driving transistor DRT.

If a turn-on level scan signal is applied to the first gate line GL1 and the second gate line GL2, the switching transistor SWT and the sensing transistor SENT can be turned on. The data voltage Vdata can be applied to the first node N1 and the reference voltage Vref can be applied to the second node N2.

The driving current supplied by the driving transistor DRT can be determined according to the difference between the voltage of the first node N1 and the voltage of the second node N2.

The light emitting device ED can express brightness according to a driving current supplied through the driving transistor DRT.

The driving current supplied to the light emitting device ED by the driving transistor DRT may not be uniform due to a difference or change in characteristic values such as threshold voltage or mobility of the driving transistor DRT. In addition, the luminance of the light emitting device ED may not be constant according to the driving current due to a difference or change in threshold voltage of the light emitting device ED.

In the present specification, characteristic values of circuit elements disposed in the sub-pixel SP, such as the threshold voltage and mobility of the driving transistor DRT or the threshold voltage of the light emitting device ED, can be referred to as characteristic values of the sub-pixel SP.

The uniformity of luminance represented by the sub-pixels SP can be degraded due to a deviation of the characteristic values of the sub-pixels SP.

Embodiments of the present disclosure can provide a method for improving the quality of an image displayed by the display panel 110 by easily compensating for deviations in characteristic values of sub-pixels (SP) and increasing the accuracy of compensation.

Figure 3:
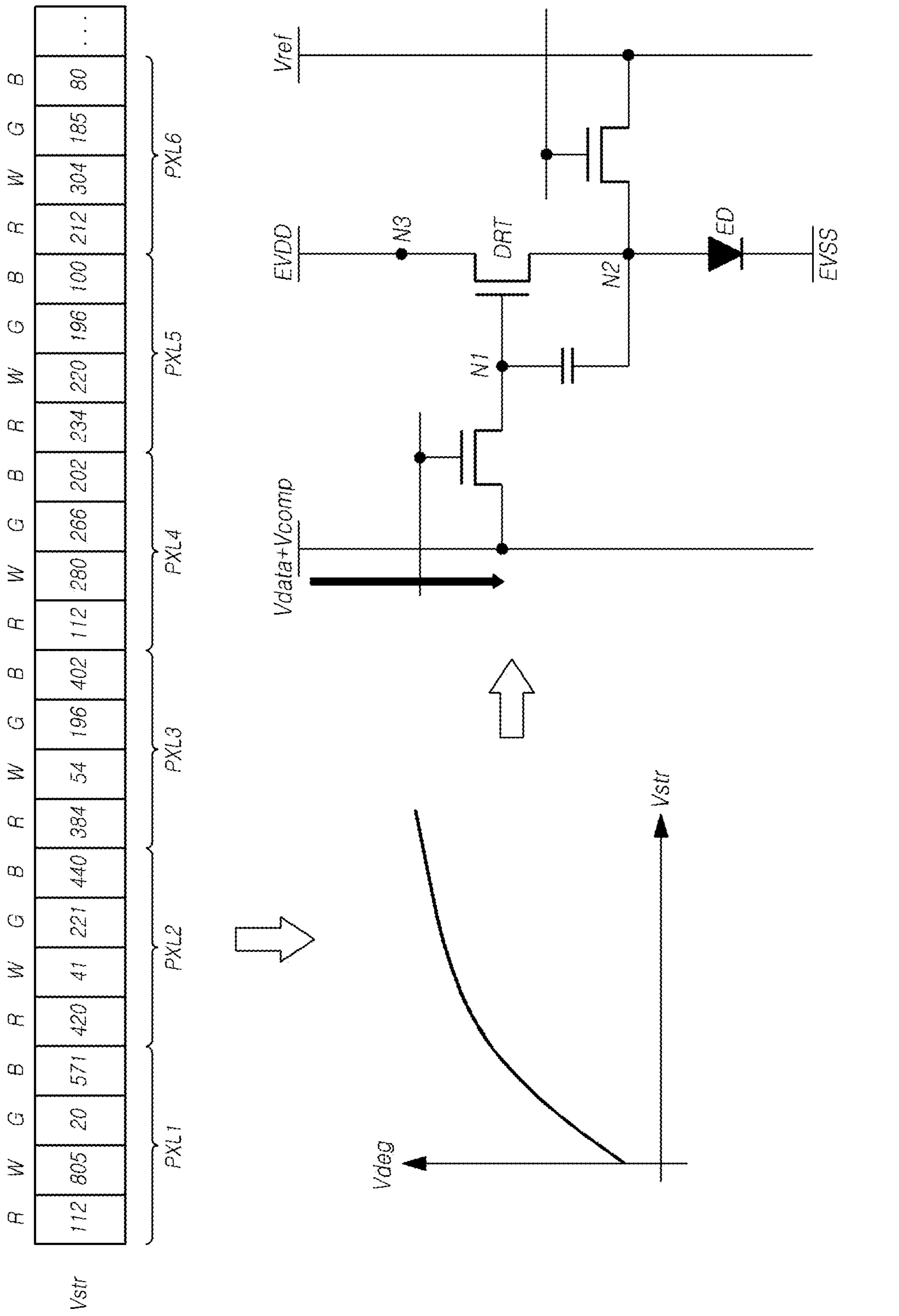
FIG. 3 illustrates an example of a method of compensating for a change in a characteristic value of a sub-pixel included in a display device according to embodiments of the present disclosure.

FIG. 3 illustrates an example of a method of compensating for a change in a characteristic value of a sub-pixel included in a display device 100 according to embodiments of the present disclosure.

Referring to FIG. 3, the display device 100 can manage a stress value Vstr of the sub-pixel SP according to driving of the display device 100. The display device 100 can predict a change in the characteristic value of the sub-pixel SP based on the stress value Vstr of the sub-pixel SP. The display device 100 can generate and apply a compensation value according to a change amount of the predicted characteristic value based on the stress value Vstr to compensate for the deviation of the characteristic value of the sub-pixel SP.

For example, application of the stress value Vstr of the sub-pixel SP and the compensation value according to the stress value Vstr can be performed by the controller 140 included in the display device 100.

The controller 140, for example, can store an initial stress value for each of the plurality of sub-pixels SP disposed on the display panel 110. As the display device 100 is driven, the controller 140 can update and manage the stress value Vstr of each of the plurality of sub-pixels SP.

As an example, FIG. 3 exemplarily illustrates a case in which one pixel PXL includes four sub-pixels SP. The pixel PXL can include red, white, green, and blue sub-pixels SP, but embodiments of the present disclosure are not limited thereto.

The controller 140 can manage the stress value Vstr of each of the red, white, green, and blue sub-pixels SP.

The stress value Vstr can be, for example, a value corresponding to an accumulated value of image data DATA for each sub-pixel SP. Alternatively, the stress value Vstr can be a value corresponding to an accumulated value of data voltages Vdata supplied to each sub-pixel SP.

For example, referring to FIG. 3, the stress values Vstr of each of the red, white, green, and blue sub-pixels SP included in a first pixel PXL1 can be 112, 805, 20, and 571. This can mean that a degree of degradation of the white sub-pixel SP included in the first pixel PXL1 is the greatest and a degree of degradation of the green sub-pixel SP is the smallest. The accumulated value of the image data DATA for the white sub-pixel SP or the accumulated value of the data voltage Vdata supplied to the white sub-pixel SP can be the largest, and the accumulated value of the image data DATA for the green sub-pixel SP or the accumulated value of the data voltage Vdata supplied to the green sub-pixel SP can be the smallest.

Similarly, the stress value Vstr of the sub-pixels SP included in each of the second to sixth pixels PXL2 to PXL6 can be managed.

The controller 140 can update and manage the stress value Vstr of the sub-pixel SP according to driving of the sub-pixel SP during the display driving period.

The controller 140 can generate a compensation value for each sub-pixel SP based on the stress value Vstr.

For example, as in the example shown in FIG. 3, the controller 140 can generate a compensation value for the sub-pixel SP by using a correction table representing a relationship between the stress value Vstr and the degradation value Vdeg.

The correction table can include, for example, a degradation table indicating a relationship between the stress value Vstr and the degradation value Vdeg, and a compensation table indicating a relationship between the degradation value Vdeg and the compensation value. In some cases, the correction table can include all relationships between the stress value Vstr, the degradation value Vdeg, and the compensation value.

The controller 140 can check the degradation value Vdeg according to the stress value Vstr of each sub-pixel SP and the compensation value set according to the degradation value Vdeg.

The controller 140 can set a compensation value corresponding to the stress value Vstr as a compensation value for the corresponding sub-pixel SP.

The compensation value set by the controller 140 can be reflected in the data voltage Vdata. For example, the compensation value can be applied to the data voltage Vdata in the form of a gain or can be applied to the data voltage Vdata in the form of an offset. As such, a voltage obtained by adding the compensation voltage Vcomp to the data voltage Vdata by applying the gain and offset can be supplied to the sub-pixel SP.

A compensation for a change in characteristic values of circuit elements disposed in the sub-pixel SP can be performed by using the compensation voltage Vcomp. Accordingly, it is possible to prevent the luminance uniformity from deteriorating due to a deviation of the characteristic values of the sub-pixels SP.

The controller 140 can manage the stress value Vstr of each sub-pixel SP according to display driving, and compensate for deterioration of circuit elements disposed in the sub-pixel SP based on the stress value Vstr, thereby compensating for the deterioration of the sub-pixel SP in real time.

In addition, the embodiments of the present disclosure can perform compensation based on the stress value Vstr, directly detect the characteristic value of the sub-pixel SP at a preset time and update the correction table, thereby increasing the accuracy of compensation for deterioration of the sub-pixel SP.

Figure 4:
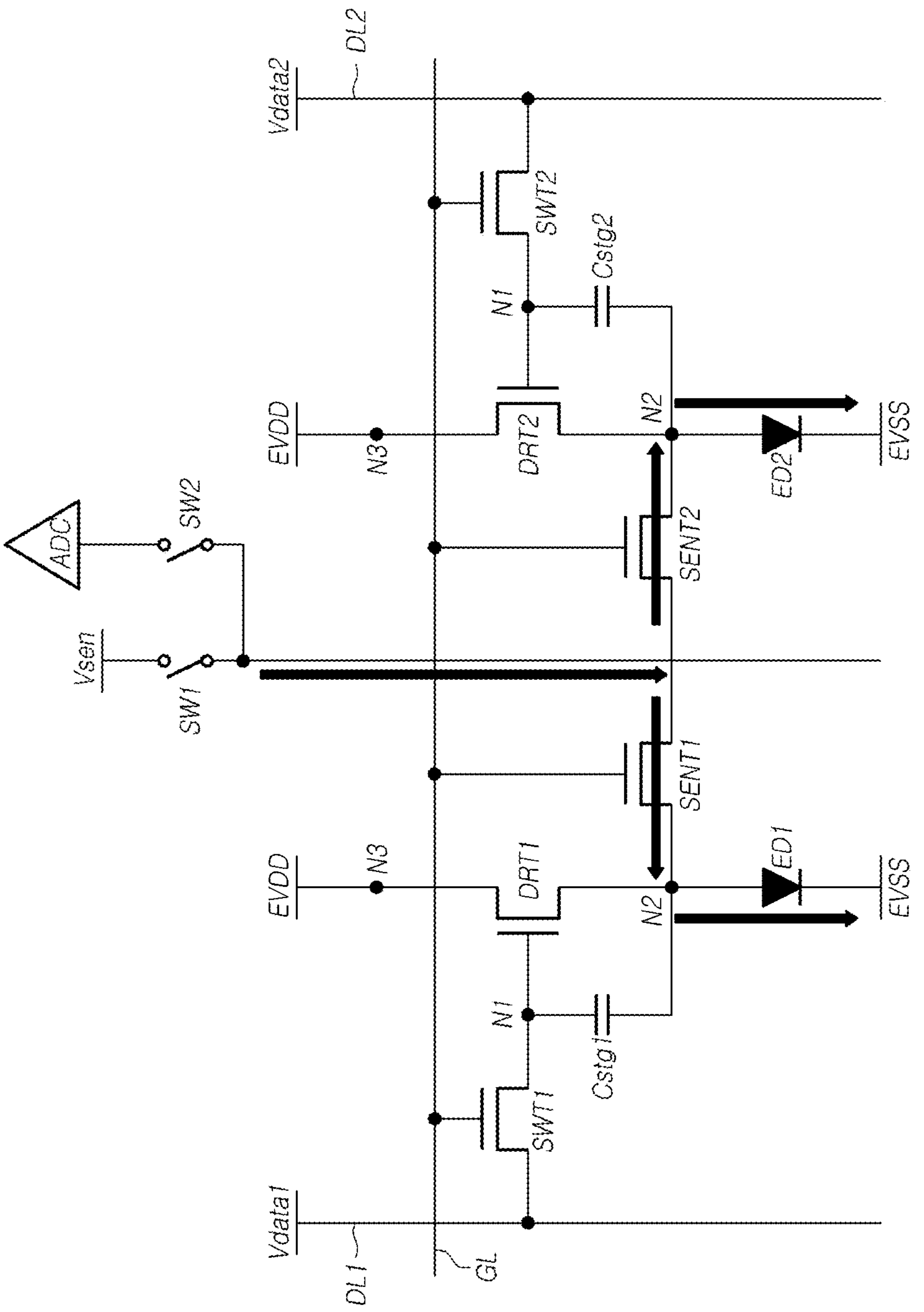
FIGS. 4 to 6 illustrate examples of a method of detecting a characteristic value of a sub-pixel included in a display device according to embodiments of the present disclosure.
Figure 5:
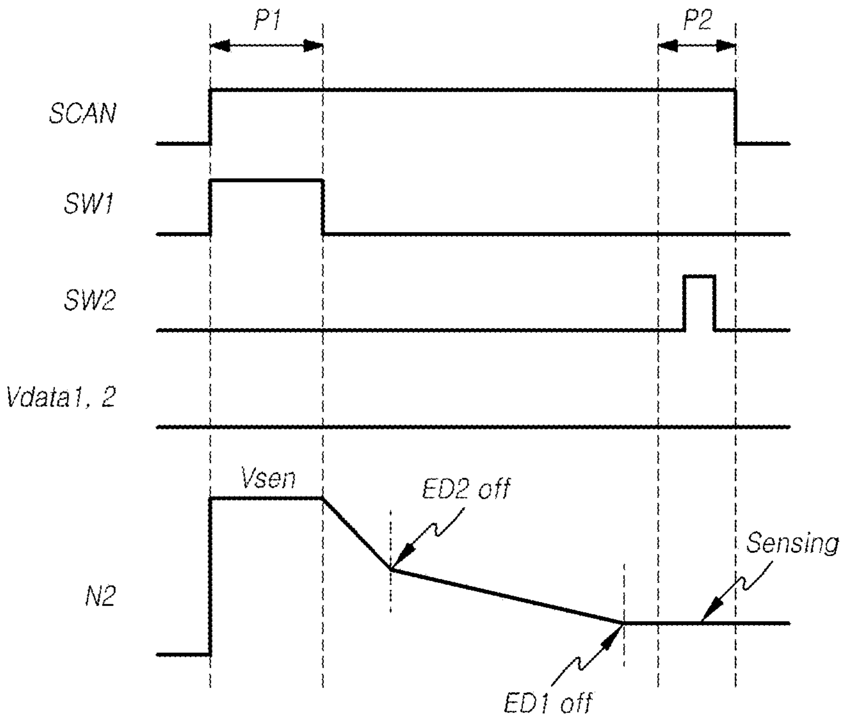
Figure 6:
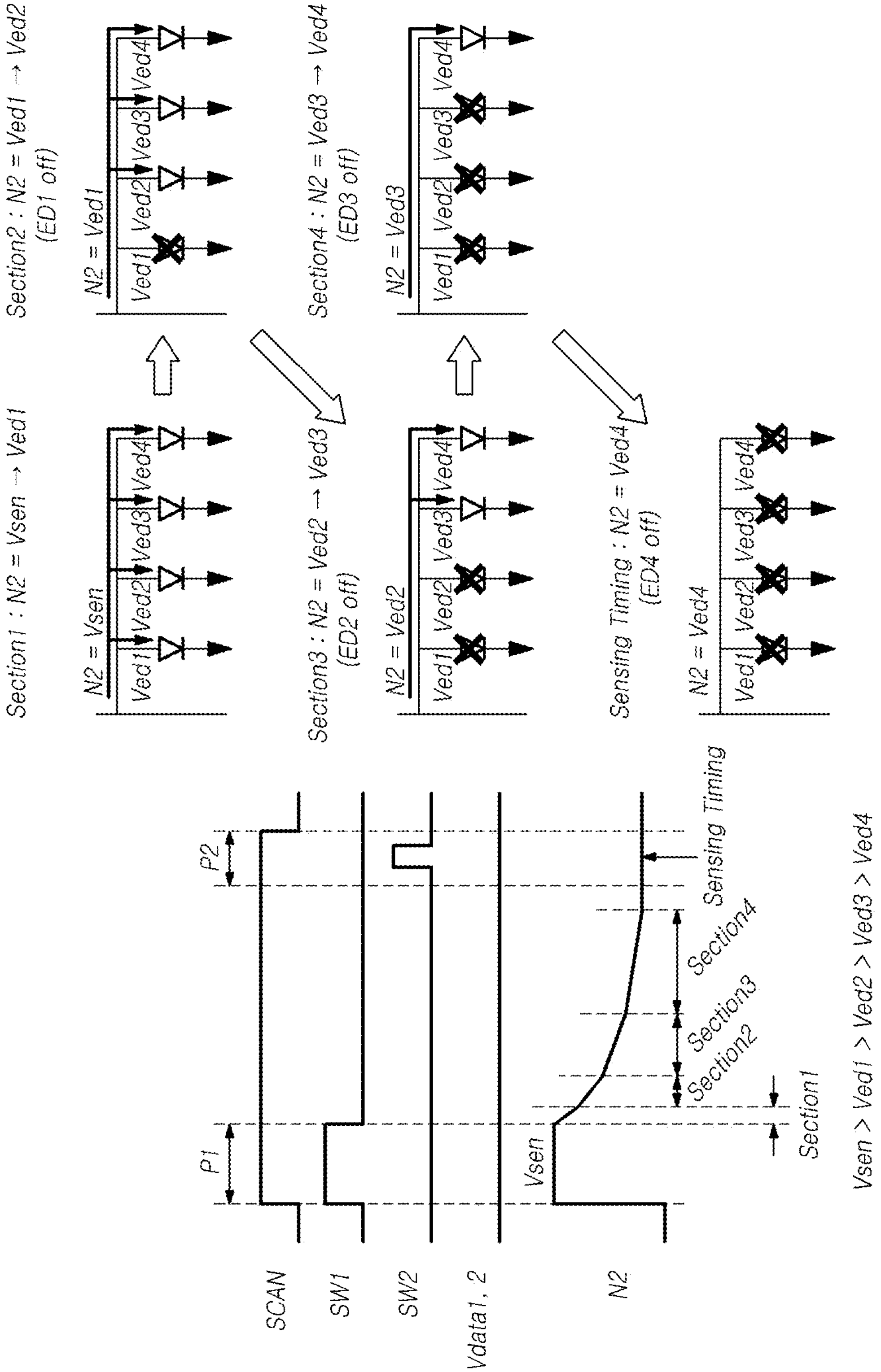

FIGS. 4 to 6 illustrate examples of a method of detecting a characteristic value of a sub-pixel included in a display device 100 according to embodiments of the present disclosure.

Referring to FIGS. 4 to 6, the controller 140 can perform compensation based on the stress value Vstr during display driving and can directly detect characteristic values of the sub-pixels SP at a preset time period.

For example, the controller 140 can detect a characteristic value of the sub-pixel SP immediately after the display device 100 is turned on or turned off. Alternatively, the controller 140 can detect a characteristic value of the sub-pixel SP in a blank period included in a frame period during display driving.

Since the controller 140 performs compensation based on the stress value Vstr, even if the characteristic value of the sub-pixel SP is directly sensed, the sensing can be performed while reducing the number of times of sensing. Therefore, it is possible to minimize the influence of the sensing operation on the driving of the display and improve the accuracy of compensation by direct sensing.

Referring to FIGS. 4 and 5, two or more sub-pixels SP disposed on the display panel 110 can share one reference voltage line RVL.

Particularly, FIG. 4 exemplarily illustrates a structure in which a first sub-pixel SP1 and a second sub-pixel SP2 share a reference voltage line RVL. However, as in the above example, four sub-pixels SP can share a reference voltage line RVL in a structure in which red, white, green, and blue sub-pixels SP constitute one pixel PXL.

In a structure in which the first sub-pixel SP1 and the second sub-pixel SP2 share the reference voltage line RVL, characteristic values of circuit elements disposed in the first sub-pixel SP1 and the second sub-pixel SP2 can be detected through the reference voltage line RVL. For example, characteristic values of a first light emitting device ED1 and a second light emitting device ED2 disposed in the first sub-pixel SP1 can be detected.

Referring to FIGS. 4 and 5, a turn-on level scan signal can be supplied through the gate line GL during a sensing period.

The gate line GL can be electrically connected to a gate node of a first switching transistor SWT1 and a gate node of a first sensing transistor SENT1 disposed in the first sub-pixel SP1. The gate line GL can be electrically connected to a gate node of a second switching transistor SWT2 and a gate node of a second sensing transistor SENT2 disposed in the second sub-pixel SP2.

Since the switching transistor SWT and the sensing transistor SENT are controlled by the same gate line GL, the number of gate lines GL disposed in the sub-pixel SP can be reduced. An aperture ratio of the sub-pixel SP can be improved by a reduction in the line disposed in the sub-pixel SP.

The first switching transistor SWT1, the first sensing transistor SENT1, the second switching transistor SWT2, and the second sensing transistor SENT2 can be turned on by a scan signal supplied to the gate line GL.

In a first period P1 of a characteristic value sensing period, a first switch SW1 electrically connected to the reference voltage line RVL can be turned on. Since the first switch SW1 is turned on, a characteristic value sensing voltage Vsen can be supplied to the reference voltage line RVL.

The first switch SW1, for example, can be located in the data driving circuit 130. In some cases, the first switch SW1 can be located in the non-active area NA of the display panel 110.

A first data voltage Vdata1 supplied to the first data line DL1 and a second data voltage Vdata2 supplied to the second data line DL2 in the first period P1 can be a voltage equal to or less than a predetermined level. In some cases, the first data line DL1 and the second data line DL2 can be floating during the first period P1.

The first data voltage Vdata1 and the second data voltage Vdata2 can be, for example, voltages at levels at which the first driving transistor DRT1 and the second driving transistor DRT2 are turned off. The first data voltage Vdata1 and the second data voltage Vdata2 can be, for example, 0V, but are not limited thereto.

Since the driving transistors DRT1 and DRT2 are not turned on according to the data voltages Vdata1 and Vdata2 supplied to the first sub-pixel SP1 and the second sub-pixel SP2, the driving current may not be supplied to the light emitting devices ED1 and ED2 through the driving transistors DRT1 and DRT2.

Since the first sensing transistor SENT1 and the second sensing transistor SENT2 are in a turn-on state, the characteristic value sensing voltage Vsen can be applied to a second node N2. The current can be supplied to the first light emitting device ED1 and the second light emitting device ED2.

The characteristic value sensing voltage Vsen can be, for example, a voltage higher than at least one of a threshold voltage of the first light emitting device ED1 and a threshold voltage of the second light emitting device ED2.

The current flows through the first light emitting device ED1 and the second light emitting device ED2 by the characteristic value sensing voltage Vsen, and the first light emitting device ED1 and the second light emitting device ED2 can emit light.

After the first period P1, the first switch SW1 can be turned off.

Since the first switch SW1 is turned off, the current supplied to the first light emitting device ED1 and the second light emitting device ED2 can be gradually discharged. The voltage of the second node N2 can gradually decrease. Since the voltage of the second node N2 gradually decreases, the first light emitting device ED1 and the second light emitting device ED2 can be turned off according to the threshold voltages of the first light emitting device ED1 and the second light emitting device ED2.

For example, in the case that a degree of degradation of the second light emitting device ED2 is greater than a degree of degradation of the first light emitting device ED1, the threshold voltage of the second light emitting device ED2 can be greater than the threshold voltage of the first light emitting device ED1.

The second light emitting device ED2 can be turned off first. Then, the first light emitting device ED1 can be turned off.

In a second period P2 of the characteristic value sensing period, a second switch SW2 electrically connected to the reference voltage line RVL can be turned on. The second switch SW2 can be, for example, electrically connected to an analog-to-digital converter ADC. The analog-to-digital converter ADC can be located in the data driving circuit 130.

The voltage of the second node N2 lowered to the threshold voltage level of the first light emitting device ED1 can be detected through the second switch SW2. Since the second node N2 of the first sub-pixel SP1 and the second node N2 of the second sub-pixel SP2 are electrically connected to the same reference voltage line RVL, only the voltage of the second node N2 of the first sub-pixel SP1 can be detected.

The controller 140 can acquire a sensing value according to a voltage detected through the reference voltage line RVL. The sensing value acquired by the controller 140 can be a value corresponding to the threshold voltage of the first light emitting device ED1 disposed in the first sub-pixel SP1 having the smallest degree of degradation.

As described above, by direct sensing through the reference voltage line RVL, the controller 140 can detect the threshold voltage of the light emitting device ED disposed in the sub-pixel SP having the smallest degree of degradation among the plurality of sub-pixels SP driven by one gate line GL.

Similarly, even if the four sub-pixels SP included in one pixel PXL share the reference voltage line RVL as the above example, the threshold voltage of the light emitting device ED disposed in the sub-pixel SP can be detected.

For example, referring to FIG. 6, there is an example of a method of performing characteristic value detection in a structure in which four sub-pixels SP driven by the same gate line GL are connected to a reference voltage line RVL.

An example is illustrated, in which a magnitude relationship between the characteristic value sensing voltage Vsen supplied to the reference voltage line RVL and the threshold voltages Ved1, Ved2, Ved3 and Ved4 of the light emitting devices ED disposed in the four sub-pixels SP is:

$$Vsen>Ved1>Ved2>Ved3>Ved4.$$

In a first period P1 of the characteristic value sensing period, the first switch SW1 is turned on and the characteristic value sensing voltage Vsen can be supplied to the reference voltage line RVL.

After the first period P1, the first switch SW1 can be turned off. Since the current is discharged through the light emitting device ED, the voltage of the second node N2 can gradually decrease.

The light emitting device ED can be turned off according to a section between the first period P1 and the second period P2.

For example, in Section 1, the voltage of the second node N2 can change from the characteristic value sensing voltage Vsen to the threshold voltage Ved1 of the first light emitting device ED1.

Then, in Section 2, the voltage of the second node N2 can change from the threshold voltage Ved1 of the first light emitting device ED1 to a threshold voltage Ved2 of a second light emitting device ED2. The first light emitting device ED1 can be turned off.

Similarly, since the voltage of the second node N2 gradually decreases, the second light emitting device ED2 can be turned off in Section 3, and a third light emitting device ED3 can be turned off in Section 4. After Section 4, a fourth light emitting device ED4 can also be turned off.

At a sensing timing when the second switch SW2 is turned on in the second period P2 of the characteristic value sensing period, all of the light emitting devices ED1, ED2, ED3, and ED4 can be turned off.

The voltage of the second node N2 is sensed through the reference voltage line RVL, so that a threshold voltage of the fourth light emitting device ED4 having the lowest degree of degradation among the light emitting devices ED1, ED2, ED3 and ED4 disposed in the four sub-pixels SP can be detected.

Since the characteristic value of the sub-pixel SP having the lowest degree of degradation among the plurality of sub-pixels SP sharing the reference voltage line RVL is detected, the controller 140 can detect a sensing value of a specific sub-pixel SP by corresponding to the stress value Vstr of each of the plurality of sub-pixels SP.

Alternatively, in some cases, the sensing value can be acquired by sensing only the characteristic value of the sub-pixel SP having the smallest stress value Vstr. For example, in the case that the stress value Vstr of the first sub-pixel SP1 is smaller than the stress value Vstr of the second sub-pixel SP2, a driving for sensing the characteristic value of the first sub-pixel SP1 can be performed in the characteristic value sensing period. A driving for sensing can mean to drive the sub-pixel SP for sensing the characteristic value of the sub-pixel SP. A method of driving the sub-pixel SP for sensing can be different from a method of driving the sub-pixel SP for displaying an image.

A turn-on level scan signal can be applied to the gate line GL. The switching transistors SWT1 and SWT2 and the sensing transistors SENT1 and SENT2 disposed in the first sub-pixel SP1 and the second sub-pixel SP2 can be turned on.

A first data voltage Vdata1 having a level for sensing can be supplied to a first data line DL1. A reference voltage Vref can be supplied to the reference voltage line RVL. The reference voltage Vref can be, for example, 0V.

A second data voltage Vdata2 may not be supplied to a second data line DL2, or the second data voltage Vdata2 of 0V can be supplied.

The first data voltage Vdata1 can be applied to a first node N1 of the first sub-pixel SP1, and the reference voltage Vref can be applied to a second node N2.

A turn-off level scan signal can be applied to the gate line GL.

The switching transistors SWT1 and SWT2 and the sensing transistors SENT1 and SENT2 disposed in the first sub-pixel SP1 and the second sub-pixel SP2 can be turned off.

The voltages of the first node N1 of the first sub-pixel SP1 to which the first data voltage Vdata1 is applied and the second node N2 of the first sub-pixel SP1 to which the reference voltage Vref is applied can be increased.

If the voltage of the second node N2 of the first sub-pixel SP1 converges to a specific level, the voltage of the second node N2 can be sensed through the reference voltage line RVL.

In this way, it is possible to detect the threshold voltage or mobility of the first driving transistor DRT.

A sensing value of a circuit element disposed in a sub-pixel SP having the smallest degree of degradation among sub-pixels SP sharing the reference voltage line RVL can be detected.

The controller 140 can perform compensation for a specific sub-pixel SP by using the detected sensing value. In addition, the controller 140 can update a correction table using the detected sensing value, and can generate a compensation value for a sub-pixel SP other than a specific sub-pixel SP.

Figure 7:
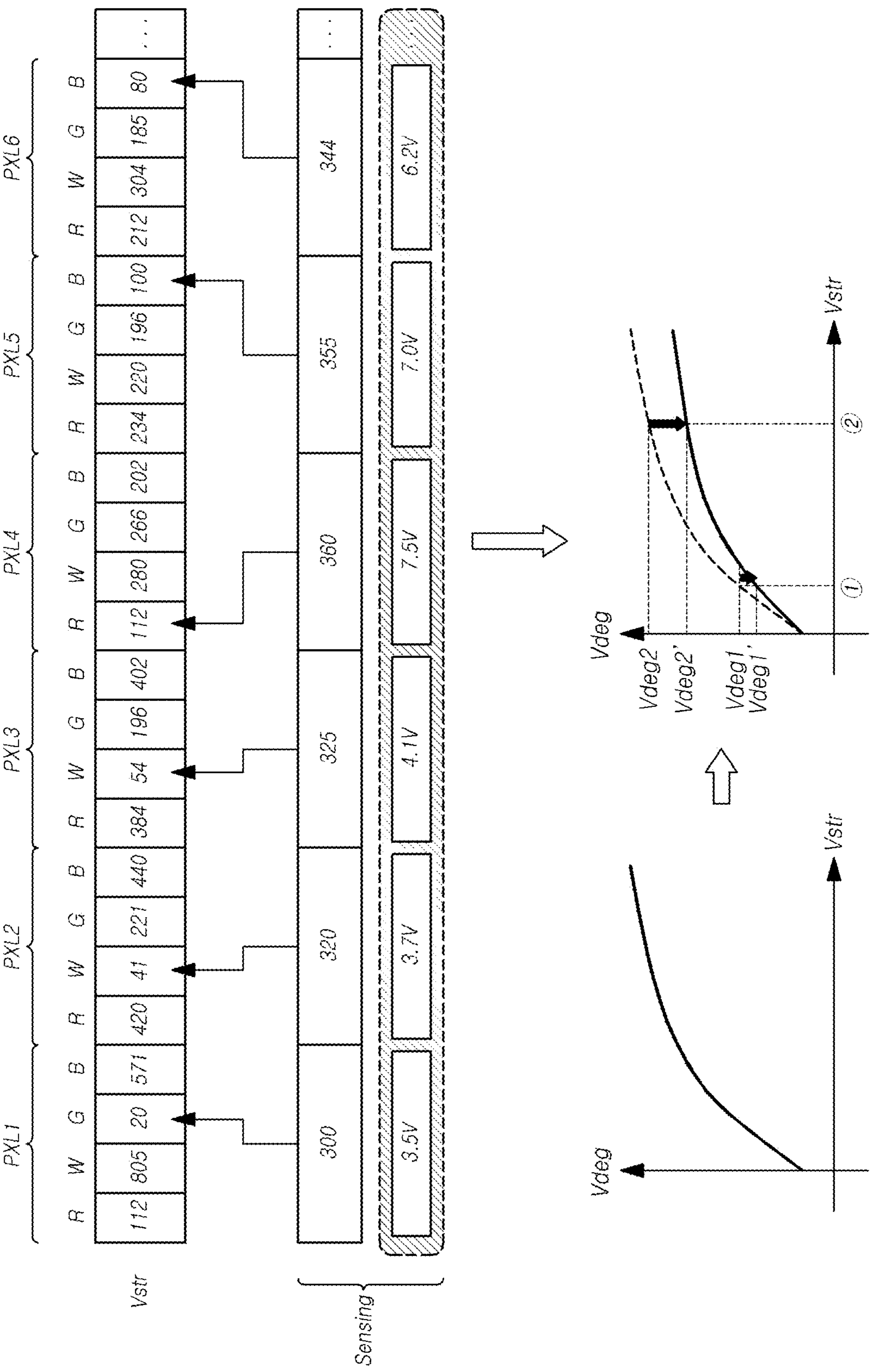
FIGS. 7 and 8 illustrate examples of a method of compensating for a change in a characteristic value of a sub-pixel according to detection of a characteristic value of a sub-pixel included in a display device according to embodiments of the present disclosure.
Figure 8:
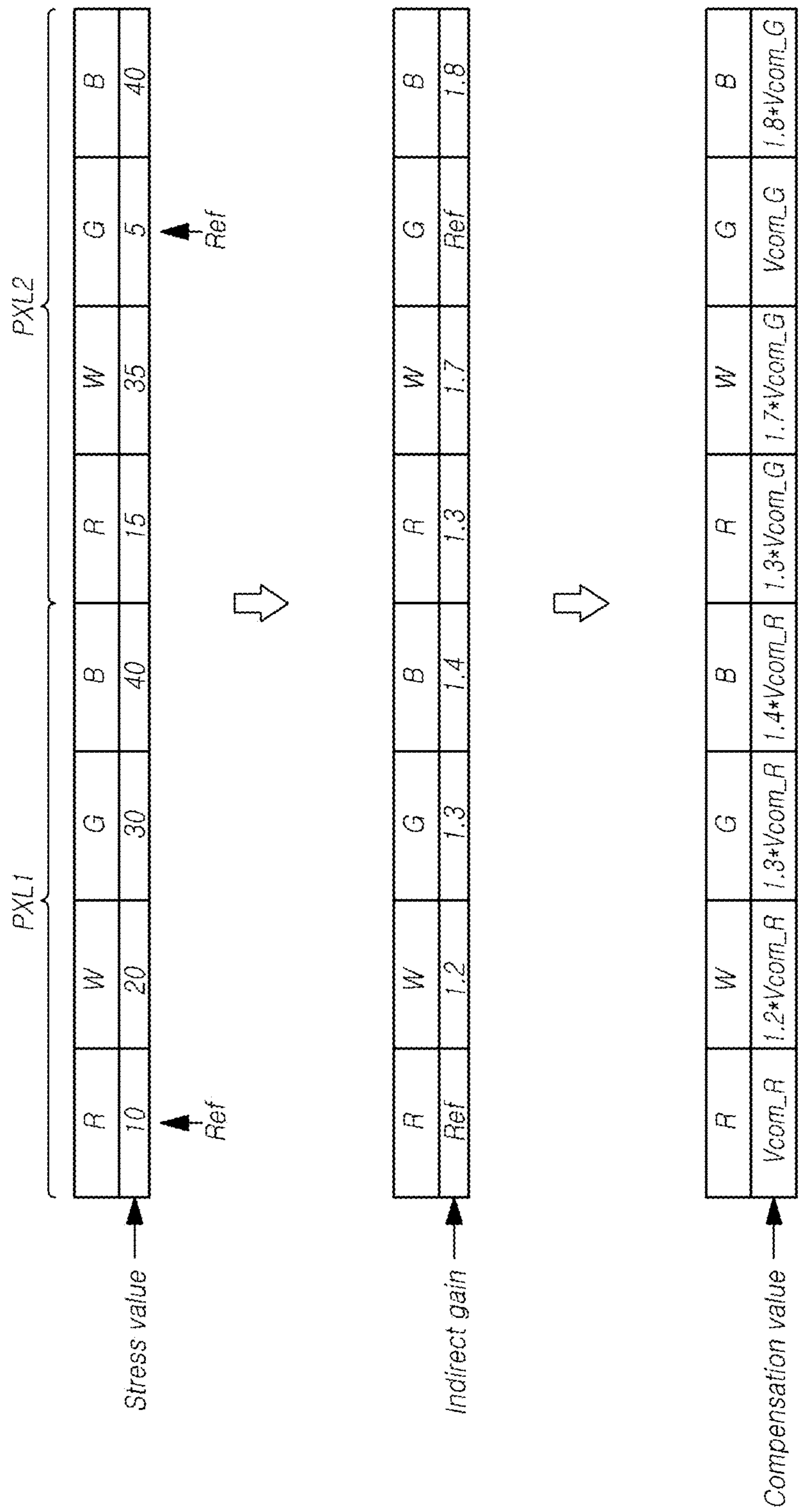

FIGS. 7 and 8 illustrate examples of a method of compensating for a change in a characteristic value of a sub-pixel SP according to detection of a characteristic value of a sub-pixel SP included in a display device 100 according to embodiments of the present disclosure.

Referring to FIG. 7, the controller 140 can manage the stress value Vstr of each of the sub-pixels SP and perform compensation based on the stress value Vstr.

If a sensing value is detected during the characteristic value sensing period, the controller 140 can check the characteristic value of a specific sub-pixel SP using the stored stress value Vstr.

For example, a voltage value of 3.5V or a sensing value of 300 can be acquired in a first pixel PXL1 through characteristic value sensing. The controller 140 can recognize the obtained voltage value or sensing value as a characteristic value of a green sub-pixel SP having the smallest stress value Vstr among the sub-pixels SP included in the first pixel PXL1.

Similarly, the controller 140 can recognize a voltage value of 3.7V or a sensing value of 320 obtained from a second pixel PXL2 through characteristic value sensing as a characteristic value of a white sub-pixel SP having the smallest stress value Vstr among the sub-pixels SP included in the second pixel PXL2.

In this way, the controller 140 can check the characteristic value of the sub-pixel SP having the smallest stress value Vstr among the sub-pixels SP included in each pixel PXL by using the sensing value acquired during the characteristic value sensing period.

The controller 140 can generate a compensation value for the corresponding sub-pixel SP by using the obtained sensing value. The controller 140 can perform compensation using the stress value Vstr before sensing the characteristic value, and perform compensation using the sensing value when sensing the characteristic value.

The controller 140 can update the correction table using the sensing value.

For example, the controller 140 can update the correction table for the green sub-pixel SP by using the sensing value obtained from the first pixel PXL1. The controller 140 can update the correction table for the white sub-pixel SP by using the sensing values obtained from the second pixel PXL2 and a third pixel PXL3.

The controller 140 can update the correction table of a red sub-pixel SP by using a sensing value obtained from a fourth pixel PXL4. The controller 140 can update the correction table of a blue sub-pixel SP by using a sensing values obtained from a fifth pixel PXL5 and a sixth pixel PXL6.

The controller 140, for example, can update the correction table by correcting a degradation value Vdeg corresponding to a stress value Vstr in the correction table.

As in the example in FIG. 7, the controller 140 can change a degradation value Vdeg in the case of a stress value Vstr of ① from Vdeg1 to Vdeg1' according to the sensing value. The controller 140 can change the degradation value Vdeg in the case of a stress value Vstr of ② from Vdeg2 to Vdeg2' according to the sensing value.

The correction table can be updated according to the sensing value, and then, the compensation can be performed based on the updated correction table in the display driving.

Accordingly it is possible to improve an accuracy of compensation based on the stress value Vstr.

In addition, the controller 140 can generate a compensation value for a sub-pixel SP for which a sensing value is not obtained by using the sensing value.

Referring to FIG. 8, the controller 140 can store and manage the stress value Vstr of each of the plurality of sub-pixels SP included in the pixel PXL.

The controller 140 can set a stress value Vstr of a sub-pixel SP having the smallest stress value Vstr among the plurality of sub-pixels SP included in one pixel PXL as a reference value Ref.

For example, the controller 140 can set a stress value Vstr of a red sub-pixel SP having the smallest stress value Vstr among the four sub-pixels SP included in a first pixel PXL1 as a reference value. In addition, the controller 140 can set a stress value Vstr of a green sub-pixel SP in a second pixel PXL2 as a reference value.

The controller 140 can set an indirect gain based on a ratio of a stress value Vstr of a sub-pixel SP set as a reference value to a stress value Vstr of another sub-pixel SP.

For example, in the case that a stress value Vstr of the red sub-pixel SP of the first pixel PXL1 is set to as a reference value, the indirect gain of each of the white, green, and blue sub-pixels SP of the first pixel PXL1 can be set to 1.2, 1.3, and 1.4. The indirect gain of each of the red, white, and blue sub-pixels SP of the second pixel PXL2 can be set to 1.3, 1.7, and 1.8.

The controller 140 can generate a compensation value for a sub-pixel SP for which a sensing value is not obtained by using an indirect gain and a compensation value calculated using a sensing value obtained in a characteristic value sensing period.

For example, if a compensation value for the red sub-pixel SP of the first pixel PXL1 is Vcom_R, the controller 140 can set compensation values for each of the white, green, and blue sub-pixels SP of the first pixel PXL1 to 1.2*Vcom_R, 1.3*Vcom_R, and 1.4*Vcom_R, respectively. In the case that a compensation value for the green sub-pixel SP of the second pixel PXL2 is Vcom_G, the controller 140 can set compensation values for each of the red, white, and blue sub-pixels SP of the second pixel PXL2 to 1.3*Vcom_G, 1.7*Vcom_G, and 1.8*Vcom_G, respectively.

Accordingly, it is possible to improve an accuracy of compensation for a sub-pixel SP for which a characteristic value is not sensed by using an indirect gain based on a ratio of the stress values Vstr to a sensing value obtained through characteristic value sensing.

In addition, the controller 140 can update the correction table of the corresponding sub-pixel SP based on a compensation value generated using the indirect gain. For example, the controller 140 can update the correction table for the corresponding sub-pixels SP using compensation values for the white, green, and blue sub-pixels SP of the first pixel PXL1 or degradation values obtained through indirect gains.

The controller 140 can update the correction table using the sensing value when the sensing value is obtained. In addition, the controller 140 can, when the sensing value is not obtained, update the correction table using the compensation value obtained based on the sensing value of the other sub-pixel SP and the indirect gain.

Figure 9:
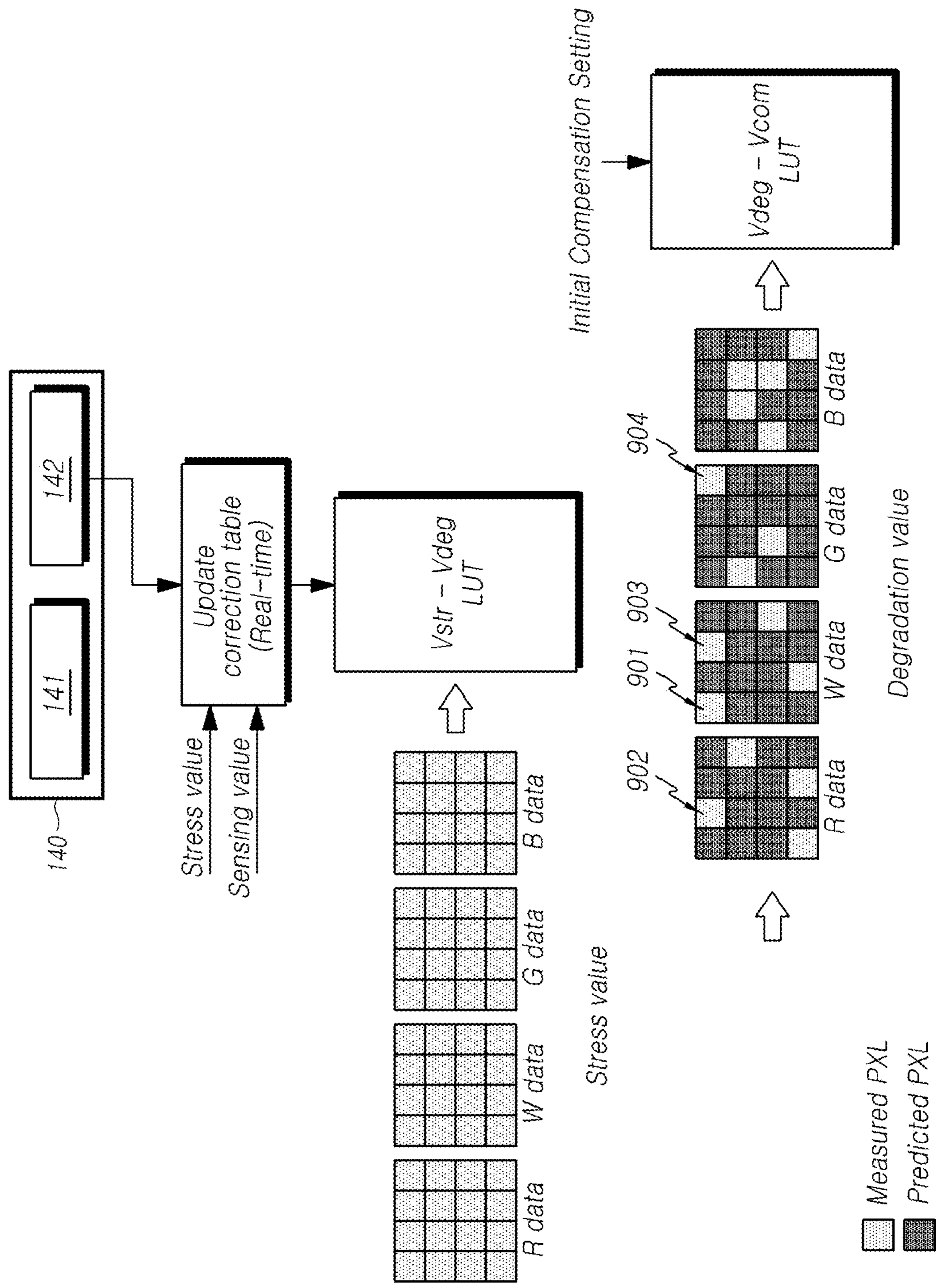
FIG. 9 illustrates an example of a method of compensating for a change in characteristic values of sub-pixels by a controller included in a display device according to embodiments of the present disclosure.

FIG. 9 illustrates an example of a method of compensating for a change in characteristic values of sub-pixels SP by a controller 140 included in a display device 100 according to embodiments of the present disclosure.

Referring to FIG. 9, the controller 140 can include, for example, a memory 141 and a compensation control module 142.

The memory 141 can store a correction table including a stress value Vstr of the sub-pixel SP and a degradation value Vdeg corresponding to the stress value Vstr. As in the above example, the correction table can be divided into a degradation table including a correspondence between the stress value Vstr and the degradation value Vdeg, and a compensation table including a correspondence between the degradation value Vdeg and a compensation value Vcom. Alternatively, in some cases, the correction table can include all correspondences between the stress value Vstr, the degradation value Vdeg, and the compensation value Vcom.

The compensation control module 142 can manage the stress value Vstr of each sub-pixel SP and perform compensation based on the stress value Vstr.

The compensation control module 142 can update the correction table based on sensing performed at a preset time period.

Since the compensation control module 142, for example, can accurately detect a degree of degradation of the sub-pixel SP based on the acquired sensing value, the compensation control module 142 can update the correction table indicating a correspondence between the stress value Vstr and the degradation value Vdeg.

The compensation control module 142 can update a correction table including a correspondence between the stress value Vstr and the degradation value Vdeg based on the sensing value. The compensation control module 142 can update the correction table for the sub-pixel SP for which the sensing value is not obtained by using a value obtained by the sensing value and the indirect gain.

The compensation control module 142 can generate a compensation value Vcom for each sub-pixel SP based on a degradation value measured or predicted through sensing.

In the case of a sub-pixel SP for which a sensing value is obtained, a compensation value Vcom based on a measured value can be applied. Alternatively, in the case of a sub-pixel SP for which a sensing value is not obtained, a compensation value Vcom based on a predicted value can be applied.

For example, in the case of a pixels PXL indicated by 901 and 903 in FIG. 9, a compensation value Vcom for a white sub-pixel SP can be a compensation value Vcom based on the sensing value, and a compensation value Vcom for each of the remaining sub-pixels SP can be a compensation value Vcom based on a predicted value using an indirect gain. In the case of a pixel PXL indicated by 902, a compensation value Vcom for the red sub-pixel SP can be a compensation value Vcom based on the sensing value, and a compensation value Vcom for each of the remaining sub-pixels SP can be a compensation value Vcom based on a predicted value. In the case of a pixel PXL indicated by 904, a compensation value Vcom for the green sub-pixel SP can be a compensation value Vcom based on the sensing value, and a compensation value Vcom for each of the remaining sub-pixels SP can be a compensation value Vcom based on a predicted value.

The accuracy of compensation can be improved through compensation based on a measurement value among compensation based on a stress value.

In addition, since the compensation value Vcom based on the sensing value and the indirect gain is applied to the sub-pixel SP for which the sensing value is not obtained, even if a deviation of the degradation value Vdeg corresponding to the stress value Vstr occurs, it is possible to reduce an error of the compensation value due to the deviation of the degradation value.

Figure 10:
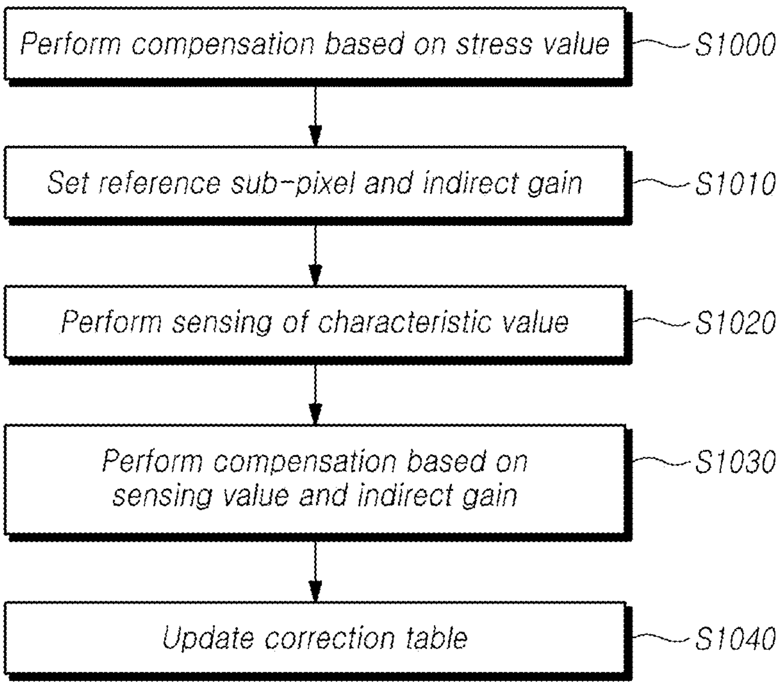
FIG. 10 illustrates an example of a process of a method of compensating for a change in a characteristic value of a sub-pixel included in a display device according to embodiments of the present disclosure.

FIG. 10 illustrates an example of a process of a method of compensating for a change in a characteristic value of a sub-pixel SP included in a display device 100 according to embodiments of the present disclosure.

Referring to FIG. 10, the controller 140 can store and manage a stress value Vstr according to driving of each sub-pixel SP.

The controller 140 can perform a compensation for degradation of the sub-pixel SP based on the stress value Vstr of each sub-pixel SP (S1000).

The controller 140 can set a reference sub-pixel SP by comparing the stress values Vstr of the sub-pixels SP sharing a reference voltage line RVL. In addition, the controller 140 can set an indirect gain based on a ratio of the stress value Vstr (S1010). The ratio of the stress value Vstr can mean that a ratio between the stress values Vstr of each of two or more sub-pixels SP sharing the reference voltage line RVL which is used to sense the characteristics of the sub-pixels SP. For example, the ratio of the stress value Vstr can mean a ratio of a stress value Vstr of one sub-pixel SP to a stress value Vstr of another sub-pixel SP. Alternatively, the ratio of the stress value Vstr can mean a ratio of a stress value Vstr of one sub-pixel SP to a sum of the stress value Vstr of the one sub-pixel SP and a stress value Vstr of another sub-pixel SP.

The controller 140 can sense the characteristic value of the sub-pixel SP at a preset time period (S1020).

The controller 140 can simultaneously perform sensing of the characteristic values of two or more sub-pixels SP sharing the reference voltage line RVL. Alternatively, in some cases, the controller 140 can perform sensing of only a characteristic value of one sub-pixel SP among two or more sub-pixels SP sharing the reference voltage line RVL.

The controller 140 can perform compensation based on the indirect gain and the sensing value obtained through characteristic value sensing (S1030).

The controller 140 can perform compensation for a sub-pixel SP for which a corresponding sensing value is detected using the obtained sensing value. The controller 140 can perform compensation using an indirect gain for the remaining sub-pixels SP for which sensing values are not obtained.

The controller 140 can update a correction table indicating a correspondence between the stress value Vstr and the degradation value Vdeg using the obtained sensing value (S1040). In addition, the controller 140 can update a correction table for a sub-pixel SP for which a sensing value has not been obtained by using the sensing value and the indirect gain.

Accordingly, it is possible to perform a real-time compensation using the stress value Vstr, and improve the accuracy of compensation by updating the correction table through characteristic value sensing performed at a preset time period.

In addition, since compensation is performed for a sub-pixel SP for which a sensing value is not detected using an indirect gain according to a ratio of the stress value Vstr to a sensing value, even if it is not easy to perform sensing for each sub-pixel SP sharing a sensing line or even if the sensing is performed for only one sub-pixel SP, it is possible to increase the accuracy of compensation through characteristic value sensing.

The brief description of the embodiments of the present disclosure described above is as follows.

A display device according to embodiments of the present disclosure can include a plurality of pixels disposed on a display panel and including a first sub-pixel and a second sub-pixel, and a controller configured to store a first stress value corresponding to an accumulated value of image data for the first sub-pixel and a second stress value corresponding to an accumulated value of image data for the second sub-pixel and generate, when a first sensing value of the first sub-pixel is detected during a characteristic value sensing period for the first sub-pixel and the second sub-pixel, a second compensation value for the second sub-pixel using an indirect gain according to a ratio between the first stress value and the second stress value and the first sensing value.

The first stress value can be less than the second stress value.

During the characteristic value sensing period, a characteristic value sensing for the first sub-pixel and a characteristic value sensing for the second sub-pixel can be simultaneously performed.

Alternatively, during the characteristic value sensing period, a characteristic value sensing for the first sub-pixel can be performed and a characteristic value sensing for the second sub-pixel may not be performed.

The controller can generate a first compensation value for the first sub-pixel using the first stress value before detecting the first sensing value, and can generate the first compensation value for the first sub-pixel using the first sensing value if the first sensing value is detected.

The controller can update a first correction table which is set for the first sub-pixel using the first sensing value, and the first correction table can include the first stress value and a first characteristic value corresponding to the first stress value.

If the first stress value is changed after the characteristic value sensing period, the controller can generate a first compensation value for the first sub-pixel using the first correction table.

The controller can update a second correction table which is set for the second sub-pixel using the second sensing value, and the second correction table can include the second stress value and a second characteristic value corresponding to the second stress value.

The display device can further include a reference voltage line shared by the first sub-pixel and the second sub-pixel. A characteristic value sensing voltage can be supplied to the reference voltage line during the characteristic value sensing period.

The first sensing value can be detected through the reference voltage line during the characteristic value sensing period.

The characteristic value sensing voltage can be greater than a threshold voltage of at least one light emitting device included in each of the first sub-pixel and the second sub-pixel.

The display device can further include a first switch electrically connected to the reference voltage line, turned on in a first period of the characteristic value sensing period, and controlling a supply of the characteristic value sensing voltage, and a second switch electrically connected to the reference voltage line, turned on in a second period of the characteristic value sensing period, and controlling sensing of a voltage of the reference voltage line.

A light emitting device included in the second sub-pixel can be changed from a turn-on state to a turn-off state between the first period and the second period.

There can exist a period in which all of the light emitting devices included in the first sub-pixel and the second sub-pixel are in a turn-on state between the first period and the second period, and all of the light emitting devices can be in a turn-off state in the second period.

The display device can further include a first data line for supplying a data voltage to the first sub-pixel and a second data line for supplying a data voltage to the second sub-pixel. A voltage below a predetermined level can be supplied to the first data line and the second data line during the characteristic value sensing period.

The voltage below the predetermined level can be a voltage at a level at which driving transistors included in each of the first sub-pixel and the second sub-pixel are turned off.

A controller according to embodiments of the present disclosure can include a memory for storing a first correction table including a first stress value corresponding to an accumulated value of image data of a first sub-pixel and a first characteristic value corresponding to the first stress value, and a second correction table including a second stress value corresponding to an accumulated value of image data of a second sub-pixel and a second characteristic value corresponding to the second stress value, and can include a compensation control module configured to generate a second compensation value for the second sub-pixel by using a first sensing value of the first sub-pixel detected in a characteristic value sensing period of the first sub-pixel and the second sub-pixel, and update the first correction table.

The first stress value can be less than the second stress value, and a characteristic value sensing for the first sub-pixel and a characteristic value sensing for the second sub-pixel can be simultaneously performed during the characteristic value sensing period.

The compensation control module can generate a first compensation value for the first sub-pixel using the first sensing value, and generate the first compensation value for the first sub-pixel using the updated first correction table when the first stress value is changed after the characteristic value sensing period.

The compensation control module can update the second correction table using the second compensation value.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims.

What is claimed is:

1. A display device comprising:

a plurality of pixels disposed on a substrate and including a first sub-pixel and a second sub-pixel; and a controller configured to:

store a first stress value corresponding to an accumulated value of image data for the first sub-pixel and a second stress value corresponding to an accumulated value of image data for the second sub-pixel, and when a first sensing value of the first sub-pixel is detected during a characteristic value sensing period for the first sub-pixel and the second sub-pixel, generate a second compensation value for the second sub-pixel using an indirect gain according to a ratio between the first and second stress values and the first sensing value.

2. The display device of claim 1, wherein the first stress value is less than the second stress value.

3. The display device of claim 1, wherein, during the characteristic value sensing period, a characteristic value sensing for the first sub-pixel and a characteristic value sensing for the second sub-pixel are simultaneously performed.

4. The display device of claim 1, wherein, during the characteristic value sensing period, a characteristic value sensing for the first sub-pixel is performed while a characteristic value sensing for the second sub-pixel is not performed.

5. The display device of claim 1, wherein the controller generates a first compensation value for the first sub-pixel using the first stress value before detecting the first sensing value, and generates the first compensation value for the first sub-pixel using the first sensing value if the first sensing value is detected.

6. The display device of claim 1, wherein the controller updates a first correction table which is set for the first sub-pixel using the first sensing value, and wherein the first correction table includes the first stress value and a first characteristic value corresponding to the first stress value.

7. The display device of claim 6, wherein, if the first stress value is changed after the characteristic value sensing period, the controller generates a first compensation value for the first sub-pixel using the first correction table.

8. The display device of claim 1, wherein the controller updates a second correction table which is set for the second sub-pixel using a second sensing value, and wherein the second correction table includes the second stress value and a second characteristic value corresponding to the second stress value.

9. The display device of claim 1, further comprising a reference voltage line shared by the first sub-pixel and the second sub-pixel, wherein a characteristic value sensing voltage is supplied to the reference voltage line during the characteristic value sensing period.

10. The display device of claim 9, wherein the first sensing value is detected through the reference voltage line during the characteristic value sensing period.

11. The display device of claim 9, wherein the characteristic value sensing voltage is greater than a threshold voltage of at least one light emitting device included in each of the first sub-pixel and the second sub-pixel.

12. The display device of claim 9, further comprising:

a first switch electrically connected to the reference voltage line, configured to be turned on in a first period of the characteristic value sensing period, and configured to control a supply of the characteristic value sensing voltage; and a second switch electrically connected to the reference voltage line, configured to be turned on in a second period of the characteristic value sensing period, and configured to control sensing of a voltage of the reference voltage line.

13. The display device of claim 12, wherein a light emitting device included in the second sub-pixel is changed from a turn-on state to a turn-off state between the first period and the second period.

14. The display device of claim 12, wherein a period in which all of light emitting devices included in the first sub-pixel and the second sub-pixel are in a turn-on state exists between the first period and the second period, and all of the light emitting devices are in a turn-off state in the second period.

15. The display device of claim 9, further comprising a first data line configured to supply a data voltage to the first sub-pixel and a second data line configured to supply a data voltage to the second sub-pixel, wherein a voltage below a predetermined level is supplied to the first data line and the second data line during the characteristic value sensing period.

16. The display device of claim 15, wherein the voltage below the predetermined level is a voltage at a level at which a driving transistor included in each of the first sub-pixel and the second sub-pixel is turned off.

17. A controller comprising:

a memory configured to store a first correction table including a first stress value corresponding to an accumulated value of image data of a first sub-pixel and a first characteristic value corresponding to the first stress value, and store a second correction table including a second stress value corresponding to an accumulated value of image data of a second sub-pixel and a second characteristic value corresponding to the second stress value; and a compensation control module configured to generate a second compensation value for the second sub-pixel by using a first sensing value of the first sub-pixel detected in a characteristic value sensing period of the first sub-pixel and the second sub-pixel, and update the first correction table, wherein the second compensation value for the second sub-pixel uses an indirect gain according to a ratio between the first and second stress values and the first sensing value.

18. The controller of claim 17, wherein the first stress value is less than the second stress value, and a characteristic value sensing for the first sub-pixel and a characteristic value sensing for the second sub-pixel are simultaneously performed during the characteristic value sensing period.

19. The controller of claim 17, wherein the compensation control module generates a first compensation value for the first sub-pixel using the first sensing value, and generates the first compensation value for the first sub-pixel using the updated first correction table when the first stress value is changed after the characteristic value sensing period.

20. The controller of claim 17, wherein the compensation control module updates the second correction table using the second compensation value.

* * * * *